US011457353B2

(12) United States Patent
Niemi et al.

(10) Patent No.: US 11,457,353 B2
(45) Date of Patent: Sep. 27, 2022

(54) INDICATION OF ADDITIONAL SECURITY CAPABILITIES USING NAS SIGNALING IN 5G MOBILE COMMUNICATIONS

(71) Applicant: MediaTek Singapore Pte. Ltd., Singapore (SG)

(72) Inventors: Marko Niemi, Oulu (FI); Jarkko Eskelinen, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 608 days.

(21) Appl. No.: 16/452,317

(22) Filed: Jun. 25, 2019

(65) Prior Publication Data

US 2019/0394641 A1 Dec. 26, 2019

Related U.S. Application Data

(60) Provisional application No. 62/689,350, filed on Jun. 25, 2018.

(51) Int. Cl.
*H04W 12/041* (2021.01)
*H04W 84/04* (2009.01)

(52) U.S. Cl.
CPC ........ *H04W 12/041* (2021.01); *H04W 84/042* (2013.01)

(58) Field of Classification Search
CPC .......................... H04W 12/041; H04W 84/042
See application file for complete search history.

(56) References Cited

U.S. PATENT DOCUMENTS

2016/0095108 A1 3/2016 Ryoo et al.

FOREIGN PATENT DOCUMENTS

CN 101841810 A 9/2010
CN 104969578 A 10/2015

OTHER PUBLICATIONS

3GPP Organizational Partners, "3GPP TS 24.501, 3rd Generation Partnership Project; Technical Specification Group Core Network and Terminals; Non-Access-Stratum (NAS) protocol for 5G System (5GS); Stage 3 (Release 15)", dated Mar. 2018, obtained from www.3gpp.org (Year: 2018).*

(Continued)

*Primary Examiner* — Alexander Lagor
*Assistant Examiner* — Forrest L Carey
(74) *Attorney, Agent, or Firm* — Han IP PLLC; Andy M. Han

(57) ABSTRACT

Examples pertaining to indication of additional security capabilities using non-access stratum (NAS) signaling in 5$^{th}$ Generation (5G) mobile communications are described. A processor of an apparatus (e.g., a user equipment (UE)) transmits an initial NAS message to a communication entity of a 5G mobile network. The processor then receives a message from the communication entity responsive to the transmitting, the message comprising an additional 5G security parameter information element (IE). The processor proceeds to perform a security mode control procedure using information contained in the additional 5G security parameter IE pertaining to at least one 5G security parameter.

11 Claims, 5 Drawing Sheets

(56) References Cited

OTHER PUBLICATIONS

China National Intellectual Property Administration, International Search Report and Written Opinion for International Patent Application No. PCT/CN2019/092763, dated Sep. 3, 2019.

Ericsson, Update to clause 6.7.2: ngKSI and ABBA, 3GPP TSG WG3 (Security) Meeting #91bis, S3-181760, La Jolla, U.S.A., May 21-25, 2018.

* cited by examiner

200

EXAMPLE SECURITY MODE COMMAND MESSAGE CONTENT

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Security mode command message identity | Message type 9.7 | M | V | 1 |
| | Selected NAS security algorithms | NAS security algorithms 9.10.3.32 | M | V | 1 |
| | ngKSI | NAS key set identifier 9.10.3.29 | M | V | 1/2 |
| | Spare half octet | Spare half octet 9.5 | M | V | 1/2 |
| | Replayed UE security capabilities | UE security capability 9.10.3.50 | M | LV | 3-5 |
| E- | IMEISV request | IMEISV request 9.10.3.26 | O | TV | 1 |
| 4F | $Hash_{AMF}$ | $Hash_{AMF}$ 9.10.3.25 | O | TV | 9 |
| 57 | Selected EPS NAS security algorithms | EPS NAS security algorithms 9.10.3.23 | O | TV | 2 |
| 78 | EAP message | EAP message 9.10.2.2 | O | TLV-E | 7 |
| xx | Additional 5G security parameters | Additional 5G security parameters 9.10.3.xx | O | TLV | 3 |

FIG. 2

INDICATION OF ADDITIONAL SECURITY CAPABILITIES USING NAS SIGNALING IN 5G MOBILE COMMUNICATIONS

CROSS REFERENCE TO RELATED PATENT APPLICATION(S)

The present disclosure is part of a non-provisional application claiming the priority benefit of U.S. Patent Application No. 62/689,350, filed on 25 Jun. 2018. The content of aforementioned application is herein incorporated by reference in its entirety.

TECHNICAL FIELD

The present disclosure is generally related to mobile communications and, more particularly, to indication of additional security capabilities using non-access stratum (NAS) signaling in 5$^{th}$ Generation (5G) mobile communications.

BACKGROUND

Unless otherwise indicated herein, approaches described in this section are not prior art to the claims listed below and are not admitted as prior art by inclusion in this section.

In 3$^{rd}$ Generation Partnership Project (3GPP) specification 33.501 v.15.1.0, it is specified that an Access and Mobility management Function (AMF) of a 5G mobile network may provide a user equipment (UE) with a horizontal derivation parameter and/or an Anti-Bidding down Between Architectures (ABBA) parameter in a security mode command. However, under current 3GPP specification, a security mode command message does not contain an information element (IE) that could be used by the network to provide or include the horizontal derivation parameter or the ABBA parameter to the UE.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus (e.g., UE) transmitting an initial non-access stratum (NAS) message to a communication entity (e.g., gNB) of a 5G mobile network. The method may also involve the processor receiving a message from the communication entity responsive to the transmitting, the security mode command message comprising an additional 5G security parameter IE. The method may further involve the processor performing a security mode control procedure using information contained in the additional 5G security parameter IE pertaining to at least one 5G security parameter.

In one aspect, an apparatus may include a transceiver and a processor coupled to the transceiver. The transceiver may, during operation, wirelessly communicate with a communication entity (e.g., gNB) of a 5G mobile network. The processor may, during operation, perform some operations including: (a) transmitting, via the transceiver, an initial NAS message to the communication entity of the 5G mobile network; (b) receiving, via the transceiver, a message from the communication entity responsive to the transmitting, the security mode command message comprising an additional 5G security parameter IE; and (c) performing a security mode control procedure using information contained in the additional 5G security parameter IE pertaining to at least one 5G security parameter. In receiving the message, the processor may receive a security mode command message or another NAS message as the message that includes the additional 5G security parameter IE as a new optional information element added by the 5G mobile network in the security mode command message or the another NAS message.

It is noteworthy that, although description provided herein may be in the context of certain radio access technologies, networks and network topologies such as New Radio (NR) or non-3GPP access in 5G system, the proposed concepts, schemes and any variation(s)/derivative(s) thereof may be implemented in, for and by other types of radio access technologies, networks and network topologies such as, for example and without limitation, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 shows a table of an example security mode command message content in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
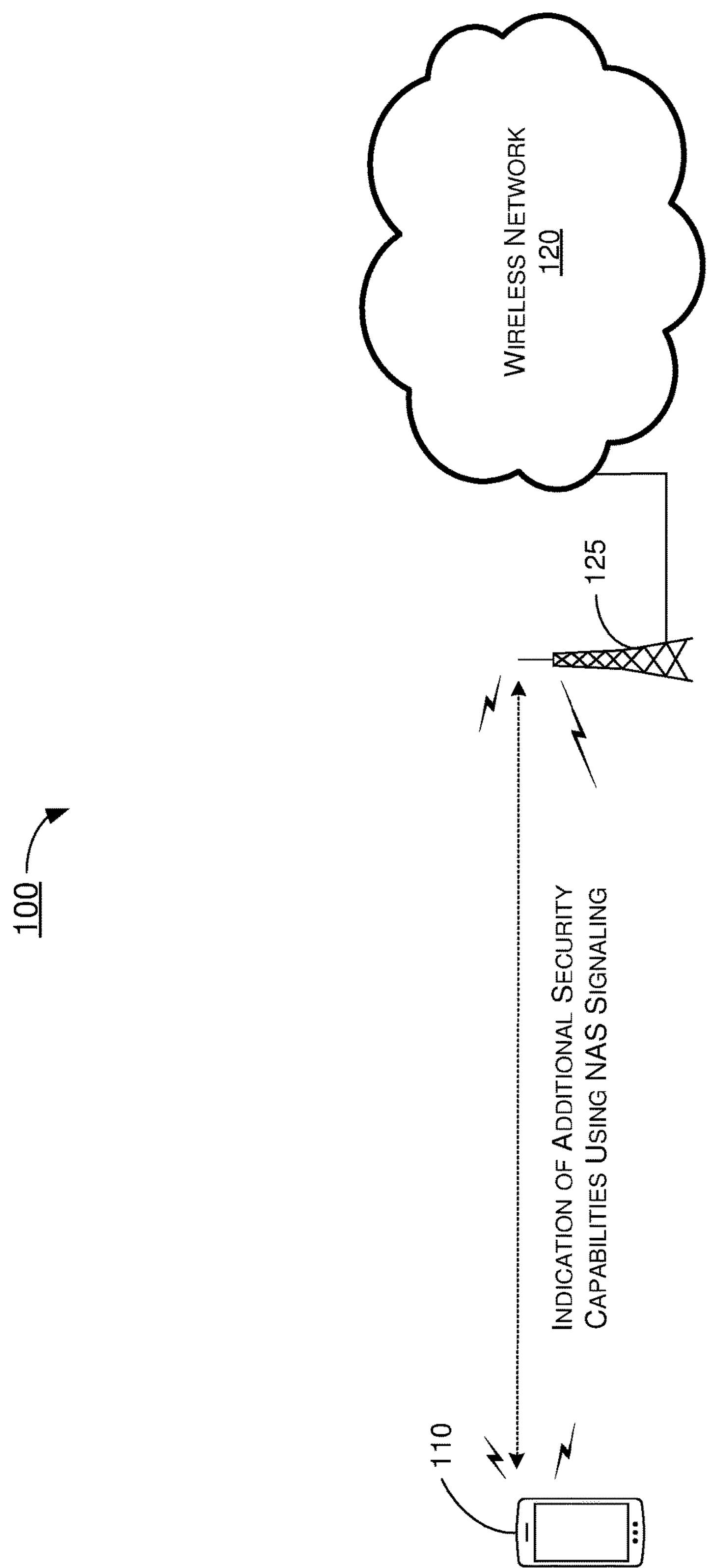
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network) via a base station 125 (e.g., a gNB or transmit-receive point (TRP)). In network environment 100, UE 110 and wireless network 120 may implement various schemes pertaining to indication of additional security capabilities using NAS signaling in 5G mobile communications in accordance with the present disclosure. For instance, UE 110 may receive, and network 120 may deliver, additional 5G security parameters based on which UE 110 may perform a security mode control procedure. The follow description of various solutions in accordance with the present disclosure is provided with reference to FIG. 1.

Under a proposed scheme in accordance with the present disclosure, the security mode command may be upgraded or otherwise modified to incorporate a new information element (IE) that contains new and/or additional security parameters such as, for example and without limitation, the horizontal derivation parameter and/or the ABBA parameter for indication from wireless network 120 to the UE 110.

Figure 3:
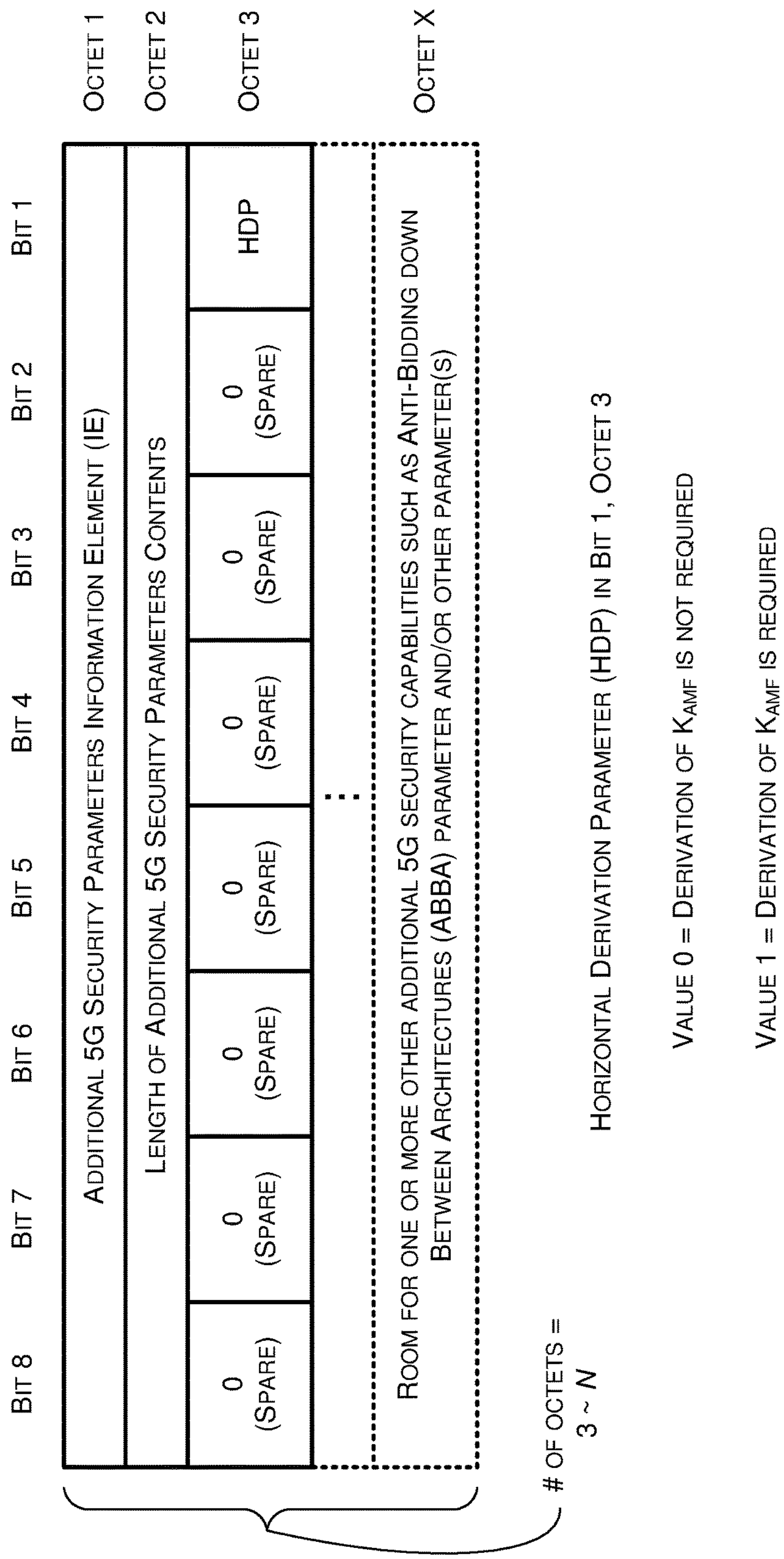
FIG. 3 is a diagram of an example information element in accordance with an implementation of the present disclosure.

FIG. 2 shows a table 200 of an example security mode command message content in accordance with an implementation of the present disclosure. FIG. 3 illustrates an example information element 300 in accordance with an implementation of the present disclosure. Referring to FIG. 2, the security mode command may be modified to include a new entry for additional 5G security parameters. Under a proposed scheme in accordance with the present disclosure, wireless network 120 may include an additional 5G security parameter information element (IE), such as information element 300, in an event that wireless network 120 needs to provide a horizontal derivation parameter to UE 110. Additionally, or alternatively, wireless network 120 may utilize the additional 5G security parameter IE to provide an ABBA parameter to UE 110.

Under the proposed scheme, the additional 5G security parameter IE may be utilized by wireless network 120 to provide UE 110 with additional security parameters as defined in 3GPP Technical Specification 33.501. UE 110 may use the security parameters for completion of a security mode control procedure. Accordingly, the length of this new and additional 5G security parameter IE may be variable (e.g., from three octets to N octets, with N being a positive integer greater than 3) based on the length of one or more parameters indicated in the IE. As an example, the additional 5G security parameter IE may be coded as that shown in FIG. 3. In some cases, the additional 5G security parameter IE may be a type 4 information element with a length of a plurality of octets (e.g., three or more octets). Referring to FIG. 3, a first octet of the plurality of octets (labeled as "Octet 1" in FIG. 3) may identify the additional 5G security parameter IE, and a second octet of the plurality of octets (labeled as "Octet 2" in FIG. 3) may include information of a length of the additional 5G security parameters IE. Moreover, a value of at least one of a plurality of bits of a third octet of the plurality of octets (labeled as "Octet 3" in FIG. 3) may indicate whether derivation of a key for an Access and Mobility management Function ($K_{AMF}$) is required. For instance, bit 1 among bit 1~bit 8 of the third octet may be utilized for this purpose, with a value of 0 indicating that derivation of $K_{AMF}$ is not required and a value of 1 indicating that derivation of $K_{AMF}$ is required. In such cases, all other bits in the third octet may be spare bits and thus may be coded with a value 0.

Under the proposed scheme, one or more other bits of a value part of the information element may be coded to indicate the ABBA parameter (and/or one or more other parameters). In some cases, the ABBA parameter (or another parameter) may be incorporated in the same IE in one or more of the spare bits of the third octet. If more bits are needed for the ABBA parameter (and/or one or more other parameters), the size of the IE may be extended to more than three octets (e.g., four or more octets) such that the total number of octets in the IE may be N. Thus, in some cases, the ABBA parameter (and/or one or more other parameters) may be indicated using one or more of the spare bits of the third octet and a plurality of bits of one or more additional octets (e.g., Octet X shown in FIG. 3). Alternatively, in some cases, the ABBA parameter (and/or one or more other parameters) may be indicated using a plurality of bits of one or more additional octets (e.g., Octet X) without using any of the spare bits in the third octet. Still alternatively, in some cases, the ABBA parameter (and/or one or more other parameters) may be indicated using all the bits of the third octet and a plurality of bits of one or more additional octets (e.g., Octet X shown in FIG. 3) when no horizontal derivation parameter is indicated in the IE.

Illustrative Implementations

Figure 4:
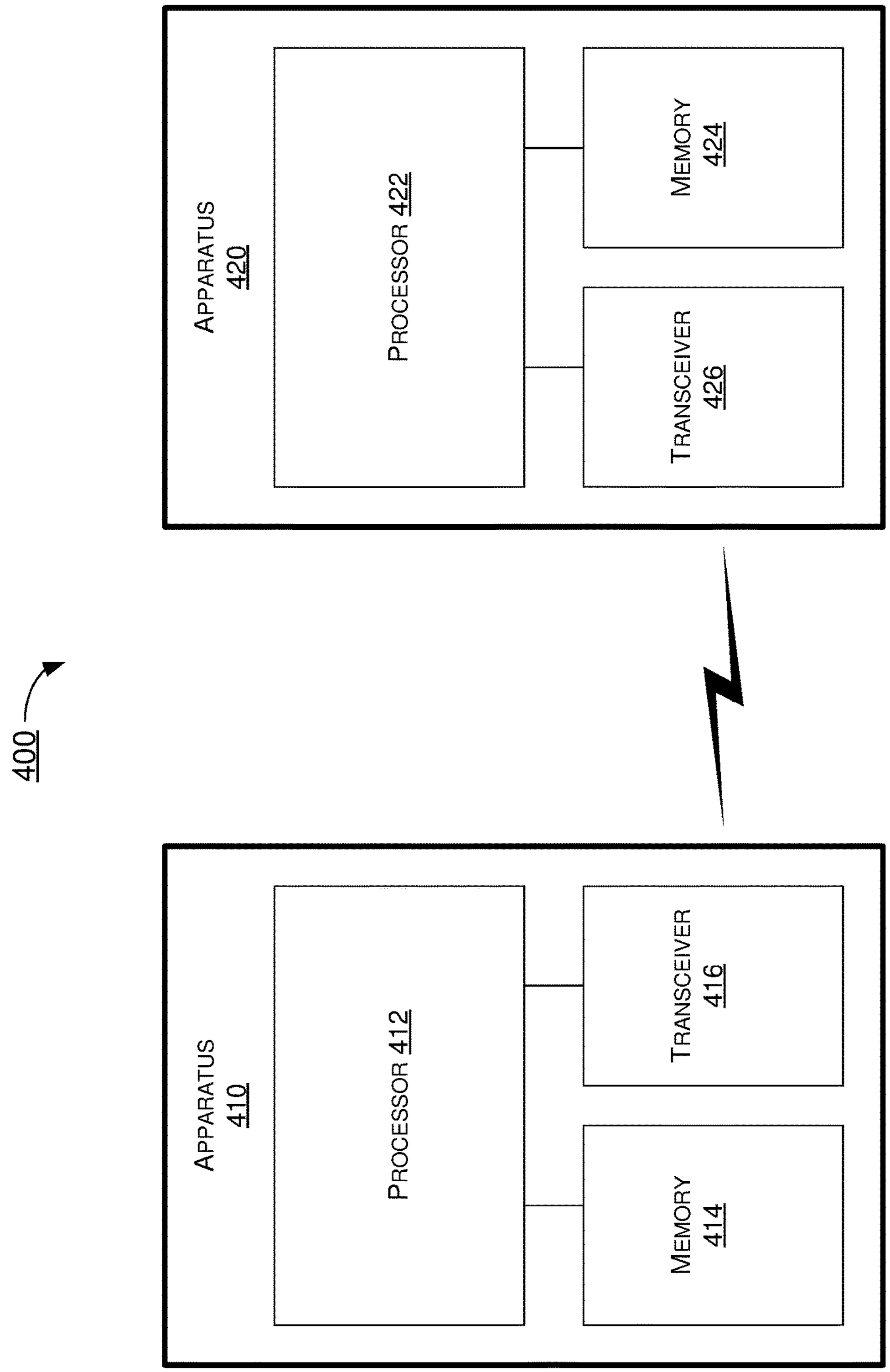
FIG. 4 is a block diagram of an example communication system in accordance with an implementation of the present disclosure.

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to indication of additional security capabilities using NAS signaling in 5G mobile communications, including the various schemes described above with respect to various proposed designs, concepts, schemes, systems and methods described above, including network environment 100, as well as processes 300, 400 and 500 described below.

Each of apparatus 410 and apparatus 420 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to indication of additional security capabilities using NAS signaling in 5G mobile communications in accordance with various implementations of the present disclosure.

In some implementations, apparatus 410 may also include a transceiver 416 coupled to processor 412. Transceiver 416 may be capable of wirelessly transmitting and receiving data. In some implementations, transceiver 416 may be capable of wirelessly communicating with different types of wireless networks of different radio access technologies (RATs). In some implementations, transceiver 416 may be equipped with a plurality of antenna ports (not shown) such as, for example, four antenna ports. That is, transceiver 416 may be equipped with multiple transmit antennas and multiple receive antennas for multiple-input multiple-output (MIMO) wireless communications. In some implementations, apparatus 420 may also include a transceiver 426 coupled to processor 422. Transceiver 426 may include a transceiver capable of wirelessly transmitting and receiving data. In some implementations, transceiver 426 may be capable of wirelessly communicating with different types of UEs/wireless networks of different RATs. In some implementations, transceiver 426 may be equipped with a plurality of antenna ports (not shown) such as, for example, four antenna ports. That is, transceiver 426 may be equipped with multiple transmit antennas and multiple receive antennas for MIMO wireless communications.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (FeRAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE, and apparatus 420, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 410 as a UE (e.g., UE 110), the same is also applicable to apparatus 420 as a network node or base station such as a gNB, TRP or eNodeB (e.g., network node 125) of a wireless network (e.g., wireless network 120) such as a 5G NR mobile network.

Under a proposed scheme for indication of additional security capabilities using NAS signaling in 5G mobile communications in accordance with the present disclosure, processor 412 of apparatus 410 may transmit, via transceiver 416, an initial NAS message to apparatus 420 as a communication entity (e.g., network node 125) of a 5G mobile network (e.g., wireless network 120). Additionally, processor 412 may receive, via transceiver 416, a message from the communication entity responsive to the transmitting, with the message including an additional 5G security parameter information element (IE). Moreover, processor 412 may perform a security mode control procedure using information contained in the additional 5G security parameter IE pertaining to at least one 5G security parameter.

In some implementations, the message may include a security mode command message that includes the additional 5G security parameter IE providing at least a horizontal derivation parameter (HDP) to the apparatus.

In some implementations, in receiving the message, processor 412 may receive a security mode command message or another NAS message as the message that includes the additional 5G security parameter IE as a new optional information element added by the 5G mobile network in the security mode command message or the another NAS message.

In some implementations, the additional 5G security parameter IE may include a type 4 IE with a length of at least three octets.

In some implementations, the at least one 5G security parameter may include a HDP.

In some implementations, in case that the at least one 5G security parameter includes a HDP, the 5G security parameter IE may include three octets. Moreover, a value of at least one of a plurality of bits of a value part of the information element may indicate whether derivation of a key for an Access and Mobility management Function ($K_{AMF}$) is required. In some implementations, the value of at least one of the plurality of bits of the value part of the information element may indicate whether the derivation of the $K_{AMF}$ is not required. In some implementations, a first octet of the 5G security parameter IE may identify the additional 5G security parameter IE. Additionally, a second octet of the 5G security parameter IE may include information of a length of the additional 5G security parameters IE.

In some implementations, in case that the at least one 5G security parameter includes a HDP, the 5G security parameter may further include an Anti-Bidding down Between Architectures (ABBA) parameter. In some implementations, the 5G security parameter IE comprises three or more octets. Additionally, a value of at least one of a plurality of bits of a third octet of the three or more octets may indicate whether derivation of a key for the Access and Mobility management Function ($K_{AMF}$) is required. Moreover, one or more other bits of a value part of the information element may be coded to indicate the ABBA parameter. In some implementations, a first octet of the three or more octets may identify the additional 5G security parameter IE. Furthermore, a second octet of the three or more octets may include information of a length of the additional 5G security parameter IE.

In some implementations, the 5G security parameter may include an ABBA parameter.

In some implementations, in performing the security mode control procedure, processor 412 may perform multiple operations. For instance, processor 412 may derive a same $K_{AMF}$ as that used by an Access and Mobility management Function (AMF) of the 5G mobile network by using a downlink NAS count value. Moreover, processor 412 may reset corresponding uplink and downlink NAS counters. Furthermore, processor 412 may derive one or more new NAS keys from the $K_{AMF}$ and one or more algorithms in use. In such cases, $K_{AMF}$ may be horizontally derived.

Illustrative Processes

Figure 5:
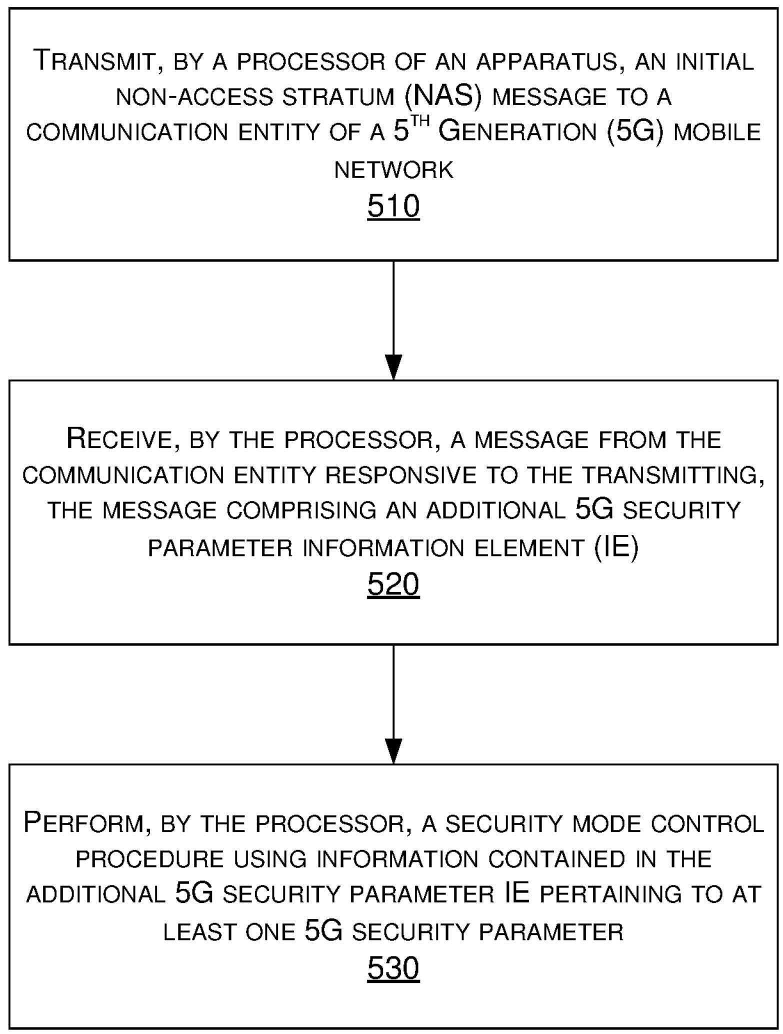
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those pertaining to FIG. 1~FIG. 4. More specifically, process 500 may represent an aspect of the proposed concepts and schemes pertaining to indication of additional security capabilities using NAS signaling in 5G mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE (e.g., UE 110) and apparatus 420 as a communication entity such as a network node or base station (e.g., network node 125) of a wireless network (e.g., wireless network 120). Process 500 may begin at block 510.

At 510, process 500 may involve processor 412 of apparatus 410 transmitting, via transceiver 416, an initial NAS message to a communication entity (e.g., apparatus 420 as network node 125) of a 5G mobile network (e.g., wireless network 120). Process 500 may proceed from 510 to 520.

At 520, process 500 may involve processor 412 receiving, via transceiver 416, a message from the communication entity responsive to the transmitting, with the message including an additional 5G security parameter information element (IE). Process 500 may proceed from 520 to 530.

At 530, process 500 may involve processor 412 performing a security mode control procedure using information contained in the additional 5G security parameter IE pertaining to at least one 5G security parameter.

In some implementations, the message may include a security mode command message that includes the additional 5G security parameter IE providing at least a horizontal derivation parameter (HDP) to the apparatus.

In some implementations, in receiving the message, process 500 may involve processor 412 receiving a security mode command message or another NAS message as the message that includes the additional 5G security parameter IE as a new optional information element added by the 5G mobile network in the security mode command message or the another NAS message.

In some implementations, the additional 5G security parameter IE may include a type 4 IE with a length of at least three octets.

In some implementations, the at least one 5G security parameter may include a HDP.

In some implementations, in case that the at least one 5G security parameter includes a HDP, the 5G security parameter IE may include three octets. Moreover, a value of at least one of a plurality of bits of a value part of the information element may indicate whether derivation of a key for an Access and Mobility management Function ($K_{AMF}$) is required. In some implementations, the value of at least one of the plurality of bits of the value part of the information element may indicate whether the derivation of the $K_{AMF}$ is not required. In some implementations, a first octet of the 5G security parameter IE may identify the additional 5G security parameter IE. Additionally, a second octet of the 5G security parameter IE may include information of a length of the additional 5G security parameters IE.

In some implementations, in case that the at least one 5G security parameter includes a HDP, the 5G security parameter may further include an Anti-Bidding down Between Architectures (ABBA) parameter. In some implementations, the 5G security parameter IE comprises three or more octets. Additionally, a value of at least one of a plurality of bits of a third octet of the three or more octets may indicate whether derivation of a key for the Access and Mobility management Function ($K_{AMF}$) is required. Moreover, one or more other bits of a value part of the information element may be coded to indicate the ABBA parameter. In some implementations, a first octet of the three or more octets may identify the additional 5G security parameter IE. Furthermore, a second octet of the three or more octets may include information of a length of the additional 5G security parameter IE.

In some implementations, the 5G security parameter may include an ABBA parameter.

In some implementations, in performing the security mode control procedure, process 500 may involve processor 412 performing multiple operations. For instance, process 500 may involve processor 412 deriving a same $K_{AMF}$ as that used by an Access and Mobility management Function (AMF) of the 5G mobile network by using a downlink NAS count value. Moreover, process 500 may involve processor 412 resetting corresponding uplink and downlink NAS counters. Furthermore, process 500 may involve processor 412 deriving one or more new NAS keys from the $K_{AMF}$ and one or more algorithms in use. In such cases, $K_{AMF}$ may be horizontally derived.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

transmitting, by a processor of an apparatus, an initial non-access stratum (NAS) message to a communication entity of a $5^{th}$ Generation (5G) mobile network;

receiving, by the processor, a message from the communication entity responsive to the transmitting, the message comprising additional 5G security information; and using, by the processor, the additional 5G security information in a security mode control procedure, wherein the additional 5G security information is comprised in an information element (IE) including a horizontal derivation parameter (HDP), wherein at least one of a plurality of bits of the IE indicates whether derivation of a key for an Access and Mobility management Function ($K_{AMF}$) is required, and wherein the at least one of the plurality of bits of the IE is a least significant bit (LSB) in an octet.

2. The method of claim 1, wherein the message comprises a security mode command message that includes the additional 5G security information providing at least the HDP to the apparatus.

3. The method of claim 1, wherein the receiving of the message comprises receiving a security mode command message or another NAS message as the message that includes the additional 5G security information as a new optional information element added by the 5G mobile network in the security mode command message or the another NAS message.

4. The method of claim 1, wherein the additional 5G security information is comprised in an information element (IE).

5. The method of claim 4, wherein a value of at least one of a plurality of bits of the IE indicates whether derivation of a key for an Access and Mobility management Function ($K_{AMF}$) is required.

6. The method of claim 5, wherein a first part of the IE identifying the additional 5G security information is included in the IE, and wherein a second part of the IE includes information of a length of the IE.

7. The method of claim 1, wherein the at least one 5G security parameter further comprises an Anti-Bidding down Between Architectures (ABBA) parameter.

8. The method of claim 1, wherein the performing of the security mode control procedure comprises:

deriving a same key for an Access and Mobility management Function ($K_{AMF}$) as that used by an Access and Mobility management Function (AMF) of the 5G mobile network by using a downlink NAS count value;

resetting corresponding uplink and downlink NAS counters; and deriving one or more new NAS keys from the $K_{AMF}$ and one or more algorithms in use, wherein the $K_{AMF}$ is horizontally derived.

9. An apparatus, comprising:

a transceiver which, during operation, wirelessly communicates with a communication entity of a $5^{th}$ Generation (5G) mobile network; and a processor coupled to the transceiver such that, during operation, the processor performs operations comprising:

transmitting, via the transceiver, an initial non-access stratum (NAS) message to the communication entity of the 5G mobile network;

receiving, via the transceiver, a message from the communication entity responsive to the transmitting, the message comprising additional 5G security information; and using the additional 5G security information in a security mode control procedure, wherein the additional 5G security information is comprised in an information element (IE) including a horizontal derivation parameter (HDP), wherein at least one of a plurality of bits of the IE indicates whether derivation of a key for an Access and Mobility management Function ($K_{AMF}$) is required, and wherein the at least one of the plurality of bits of the IE is a least significant bit (LSB) in an octet.

10. The apparatus of claim 9, wherein a first part of the IE identifying the additional 5G information is included in the IE, and wherein a second part of the IE includes information of a length of the IE.

11. The apparatus of claim 9, wherein the at least one 5G security parameter further comprises an Anti-Bidding down Between Architectures (ABBA) parameter, wherein the additional 5G security information comprises one or more bits of a plurality of bits indicating the ABBA parameter.

* * * * *